(12) United States Patent
Murakami

(10) Patent No.: US 9,548,933 B2
(45) Date of Patent: Jan. 17, 2017

(54) NETWORK SYSTEM, SWITCH, AND METHODS OF NETWORK CONFIGURATION

(71) Applicant: Takahiko Murakami, Tokyo (JP)

(72) Inventor: Takahiko Murakami, Tokyo (JP)

(73) Assignee: NEC CORPORATION, Toyko (JP)

( * ) Notice: Subject to any disclaimer, the term of this patent is extended or adjusted under 35 U.S.C. 154(b) by 183 days.

(21) Appl. No.: 14/383,072

(22) PCT Filed: Mar. 4, 2013

(86) PCT No.: PCT/JP2013/055882
§ 371 (c)(1),
(2) Date: Sep. 4, 2014

(87) PCT Pub. No.: WO2013/133227
PCT Pub. Date: Sep. 12, 2013

(65) Prior Publication Data
US 2015/0009828 A1  Jan. 8, 2015

(30) Foreign Application Priority Data

Mar. 5, 2012 (JP) ................................ 2012-048014

(51) Int. Cl.
*H04L 12/851* (2013.01)
*H04L 12/813* (2013.01)
(Continued)

(52) U.S. Cl.
CPC ......... *H04L 47/2441* (2013.01); *H04L 41/042* (2013.01); *H04L 41/0893* (2013.01);
(Continued)

(58) Field of Classification Search
CPC .... H04L 47/20; H04L 41/0893; H04L 41/042; H04L 47/2441; H04L 45/64; H04L 49/3009

See application file for complete search history.

(56) References Cited

U.S. PATENT DOCUMENTS

2011/0317701 A1* 12/2011 Yamato .................. H04L 49/25
370/392
2012/0250496 A1 10/2012 Kato
(Continued)

FOREIGN PATENT DOCUMENTS

CN  1633131 A  6/2005
CN  102427429 A  4/2012
(Continued)

OTHER PUBLICATIONS

Porras et al. A Security Enforecement Kernel for OpenFlow Networks. ACM. HotSDN '12 [online]. Aug. 13, 2012 [retrieved on May 13, 2016]. Retrieved from the Internet: <URL: http://www.openflowsec.org/FortNOX_Sigcomm_HotSDN_2012.pdf> <DOI: 978-1-4503-1477-0/12/08>.*

(Continued)

*Primary Examiner* — Omar Ghowrwal
(74) *Attorney, Agent, or Firm* — McGinn IP Law Group, PLLC.

(57) ABSTRACT

A network system of the present invention includes a switch and controllers. The switch processes on a received packet in accordance with a flow entry in which are defined a rule and an action. The controllers set the flow entry to a flow table of the switch. The switch assigns a flow table to each controller, searches when receiving a packet from outside for a flow table matching with the packet in all flow tables, ignores a flow entry set by a controller of which a status of connection is invalid among flow entries matching with the (Continued)

packet and processes the packet in accordance with an action of a flow entry set by a controller of which a status of connection is valid.

12 Claims, 6 Drawing Sheets

(51) Int. Cl.
  *H04L 12/935* (2013.01)
  *H04L 12/715* (2013.01)
  *H04L 12/24* (2006.01)

(52) U.S. Cl.
  CPC .............. *H04L 45/64* (2013.01); *H04L 47/20* (2013.01); *H04L 49/3009* (2013.01)

(56) References Cited

U.S. PATENT DOCUMENTS

| | | | |
|---|---|---|---|
| 2013/0176889 A1* | 7/2013 | Ogawa | H04L 43/10 370/252 |
| 2014/0033275 A1* | 1/2014 | Kawamoto | H04L 63/102 726/3 |
| 2015/0043585 A1* | 2/2015 | Iihoshi | H04L 45/74 370/392 |

FOREIGN PATENT DOCUMENTS

| | | | | |
|---|---|---|---|---|
| CN | 102546778 A | 7/2012 | | |
| CN | 102857416 A | 1/2013 | | |
| JP | 2011-160363 A | 8/2011 | | |
| JP | 2011-166384 A | 8/2011 | | |
| JP | WO 2012066830 A1 * | 5/2012 | ............. | H04L 43/10 |
| JP | WO 2012141086 A1 * | 10/2012 | ........... | H04L 63/102 |
| JP | 5495150 B2 | 5/2014 | | |
| WO | WO 2011/065268 A1 | 6/2011 | | |
| WO | WO 2013/133227 A1 | 9/2013 | | |

OTHER PUBLICATIONS

Controller|Define Controller at Dictionary.com [online], [retrieved on May 12, 2016]. Retrieved from the Internet: <URL: http://www.dictionary.com/browse/controller>.*

English Translation of International Preliminary Report on Patentability in PCT No. PCT/JP2013/055882 dated Sep. 9, 2014.

European Search Report dated Sep. 16, 2015.

"OpenFlow Switch Specification", Dec. 5, 2011, XP055177510, URL: https://www.opennetworking.org/images/soties/downloads/sdn-resources/onf-specifications/openflow/openflow-spec-v1.2.pdf.

Japanese Office Action dated Nov. 4, 2015 with a partial English translation thereof.

International Search Report (ISR) (PCT Form PCT/ISA/210), in PCT/JP2013/055882, dated May 7, 2013.

"OpenFlow Switch Specification, Version 1.1.0 Implemented", [online], Feb. 28, 2011, Internet (URL: http://www.openflowswitch.org/documents/openflow-spec-v1.1.0.pdf).

Chinese Office Action dated Aug. 18, 2016 and English Translation thereof.

* cited by examiner

NETWORK SYSTEM, SWITCH, AND METHODS OF NETWORK CONFIGURATION

TECHNICAL FIELD

The present invention is related to a network system, especially to a network system in which packet transferring function and path controlling function of network devices are separated.

BACKGROUND ART

A conventional network device is a black box and a control rich in flexibility for load balancing or deviation cannot be performed from outside. Thus, there was a problem in that, when a network size becomes greater, understanding and improving system behavior becomes difficult and designing and reconfiguration are accompanied by an enormous cost.

As a technique of resolving such subjects, a method is considered to separate packet transferring function and path controlling function of network devices. For example, by making a network device handle the packet transferring function and making a control apparatus separated outside of the network device handle the controlling function, a control becomes easier and a network rich in flexibility becomes able to be configured.

(Description of C/U Separation Type Network)

A C/U (Control plane/User plane) separation type network, in which an outside control device (control plane) controls a node device (user plane), is proposed as one network system with separated functions.

An OpenFlow™ network using OpenFlow™ technology in which network path control is performed by controlling a switch from a controller can be shown as an example of C/U separation type network. Details of OpenFlow™ technology is disclosed in Non-Patent Literature 1. It should be noted that OpenFlow™ network is only one example.

(Description of OpenFlow™ Network)

In an OpenFlow™ network, a control device such as an OpenFlow™ controller (OFC) operates a flow table related to path control of a node device such as an OpenFlow™ Switch (OFS) to control the node device behavior.

Hereinafter, for a simplification of description, an OpenFlow™ controller (OFC) will be denoted "controller (OFC)" and an OpenFlow™ switch (OFS) will be denoted "switch (OFS)".

A secure channel, which is a leased line or a communication path protected by SSL (Secure Socket Layer) or the like, connects between a controller (OFC) and a switch (OFS). The controller (OFC) and the switch (OFS) transmit and receive an OpenFlow™ message conformed to (compliant with) OpenFlow™ protocol via the security channel.

A switch (OFS) in an OpenFlow™ network is an edge switch and a core switch, configuring the OpenFlow™ network and under control of a controller (OFC). A series of packet flow, from a reception of packet at an edge switch on entrance (Ingress) side of an OpenFlow™ network to a transmission of packet at an edge switch on exit (Engress) side, will be called a flow.

A packet can be read as a frame. A difference between a packet and a frame is only a difference of Protocol Data Unit (PDU). A packet is a PDU of "TCP/IP" (Transmission Control Protocol/Internet Protocol). On the other hand, a frame is a PDU of "Ethernet".

A flow table is a table in which is registered a flow entry in which is defined a specified operation (action) to be performed to a packet (communication data) matching to a specified matching condition (rule).

A rule of a flow entry is defined by various combinations using some or all of a destination address, a source address, a destination port and a source port included in a header area of each protocol layer of the packet and is distinguishable. It should be noted that the above addresses include a MAC (Media Access Control) address and an IP (Internet Protocol) address. In addition to the above, information of entrance port (Ingress Port) can be used as a rule of a flow entry, too. In addition, a part (or the whole) of header area value of the packet showing a flow can be set with an expression such as a regular expression, a wild card "*" or the like as a rule of a flow entry.

An action of a flow entry shows an operation such as "output to a specific port", "drop", "rewrite header" or the like. For example, if identification information of exit port (such as an output port number, etc) is shown, a switch (OFS) outputs a packet to the corresponding port and if identification information of exit port is not shown, the switch (OFS) drops the packet. Alternatively, if header information is shown in an action of the flow entry, the switch (OFS) rewrites the header of the packet on a basis of the relevant header information.

A switch (OFS) in an OpenFlow™ network executes an action of a flow entry to a group f packets (a series of packets) matching to a rule of the flow entry.

(Subject in Existing OpenFlow™ Network)

Hereinafter, subject in existing OpenFlow™ network will be described.

(1) First subject: in an existing OpenFlow™ network, a controller (OFC) manages all the switches (OFS); consequently, a load of the controller easily increases and setting flow entry may take time.

Thus, a procedure may be taken such as, not setting all flow entries at a timing of detecting a packet, but setting a flow entry which can be set in advance not to time out and updating (rewriting) the flow entry at a timing of environment modification.

In this case, if only the controller (OFC) is made redundant and one flow table is shared by a plurality of controllers (OFC), controllers (OFC) need to synchronize between them the flow entry which is set and the flow entry synchronization function has to be supported by the controllers (OFC) side.

In addition, if the controllers are configured in a system with a redundant configuration (such as a fault tolerant system or a cluster system), when the system switches from an active system to a standby system, a status of synchronization between the old active system and the switch (OFS) and a status of synchronization between the new active system and the switch (OFS) has to be made identical, and this process takes time. It should be noted that the old active system is the controller (OFC) which switched from the active system to the standby system. In addition, the new active system is the controller (OFC) which switched from the standby system to the active system.

(2) Second subject: in addition, in an existing OpenFlow™ network, when a controller (OFC) stops, its influence may spread over whole network. Thus, a technology of making the controller redundant more freely is important or/and necessary. However, at present, such technology of making redundant is not established.

(3) Third subject: in addition, in existing OpenFlow™ network, a controller (OFC) manages whole the network. Consequently, a load of the controller (OFC) increases and performing load dispersion becomes important and necessary. However, at present, such technology related to a load balancing is not established.

(Subject Due to Difference of Flow Entry Setting Method)

In OpenFlow™, methods of setting a flow entry in a switch (OFS) can be roughly classified into two methods, a "reactive type" and "a proactive type".

The "reactive type" is a method of setting all flow entries at a trigger of packet-in. In should be noted that packet-in signifies transferring a copy of the relevant packet to the controller (OFC) to request a path calculation for the packet to the controller (OFC). In the "reactive type", when receiving an inquiry about a first packet (a new/first packet without corresponding flow entry) from the switch (OFS), the controller (OFC) calculates a path of the relevant packet set (flow) and registers a flow entry in a flow table of the switch (OFS) That is, the "reactive type" as used herein shows a "real-time flow entry registering" performed by the controller (OFC) in response to the inquiry from the switch (OFS) in an actual data communication.

The "proactive type" is basically a method of setting all flow entries which can be set in advance and adding minimal flow entry setting at a trigger of packet-in or the like in accordance with necessity. In the "proactive type", the controller (OFC) calculates "in advance (before data communication starts)" a path of a specific packet set (flow) and registers a flow entry in a flow table of the switch (OFS). That is, the "proactive type" as used herein shows a "flow entry registration in advance" voluntarily performed by the controller (OFC).

Between those two methods, the latter is better in scalability and stability. However, in fact, in an occasion of system exchanging at a failure, it can be considered that a flow is already put (some packets are already controlled as a flow) and thus the controller (OFC) which became a new active device has to inherit flow entries from the old active device and set so that the present flow status does not conflict. Therefore, a mechanism of synchronization between controllers (OFC) is necessary and controller (OFC) implementation becomes complicated. In addition, only redundant configuration supported by the controller (OFC) can be configured.

In addition, if controllers (OFC) are mutually synchronized as above and share one connection, when a failure occurs and systems switch, a difference may occurs between the synchronization status in controllers (OFC) and flow entry setting status for the switch (OFS).

Thus, a synchronization process becomes necessary between the controller (OFC) which became the new active device and the switch (OFS).

CITATION LIST

Non Patent Literature

[NPL 1]
"OpenFlow Switch Specification, Version 1.1.0 Implemented", [online], Feb. 28, 2011, internet (URL: www.openflowswitch.org/documents/openflow-spec-v1.1.0.pdf)

SUMMARY OF THE INVENTION

An objective of the present invention is to provide a network system using a communication system to a plurality of controllers and a switch having a flow table assigned for each controller.

The network system related to the present invention includes a switch which performs a process to a received packet in accordance with a flow entry in which are defined a rule and an action for uniformly control a packet as a flow and a plurality of controllers which set a flow entry in a flow table of the switch. The switch assigns a flow table to each of the plurality of controllers, searches when receiving a packet from outside for a flow entry which matches with the relevant packet in all flow tables, verifies a status of connection with each of the plurality of controllers, ignores a flow entry set by a controller of which connection status is invalid and processes the relevant packet in accordance with an action of a flow entry set by a controller of which connection status is valid.

The switch related to the present invention includes a function section which communicates with each of a plurality of controllers which set a flow entry in which are defined a rule and an action for uniformly control a packet as a flow, a function section which manages a flow table which is assigned to each controller and is set a flow entry by each controller, a function section which searches when receiving a packet from outside for a flow entry matching with the relevant packet in all flow tables, a function section which verifies a status of connection with each controller and a function section which ignores a flow entry, among flow entries matching with the relevant packet, set by a controller of which a connection status is invalid and processes the relevant packet in accordance with an action of a flow entry set by a controller of which a connection status is valid.

In the method of configuring a network related to the present invention, a switch performs a process on a received packet in accordance with a flow entry in which are defined a rule and an action for uniformly control a packet as a flow. In addition, a plurality of controllers set a flow entry into a flow table of the switch. In addition, the switch assigns a flow table to each of the plurality of controllers. In addition, when receiving a packet from outside, the switch searches for a flow entry matching with the relevant packet in all flow tables. In addition, the switch verifies a status of connection with each of the plurality of controllers. In addition, the switch ignore a flow entry, among the flow entries matching with the relevant packet, set by a controller of which the connection status is invalid and processes the relevant packet in accordance with an action of a flow entry set by a controller of which the connection status is valid.

A program related to the present invention is a program which causes a switch to execute a step of communicating with each of a plurality of controllers which set a flow entry to which are defined a rule and an action for uniformly controlling a packet as a flow, a step of managing a flow table which is assigned to each controller and to which is set a flow entry by each controller, a step of searching, when receiving a packet from outside, for a flow entry matching with the relevant packet in all flow tables, a step of verifying a status of connection with each controller, a step of ignoring a flow entry set by a controller of which a connection status is invalid and processing the relevant packet in accordance with an action of a flow entry set by a controller of which a connection status is valid. It should be noted that the program related to the present invention can be stored in a recording device or a recording medium.

The switch simultaneously communicates with a plurality of controllers, switches the flow table to use to communicate on the switch side and becomes able to correctly communicate without a function of synchronization between controllers.

DESCRIPTION OF EXEMPLARY EMBODIMENT

Figure 1:
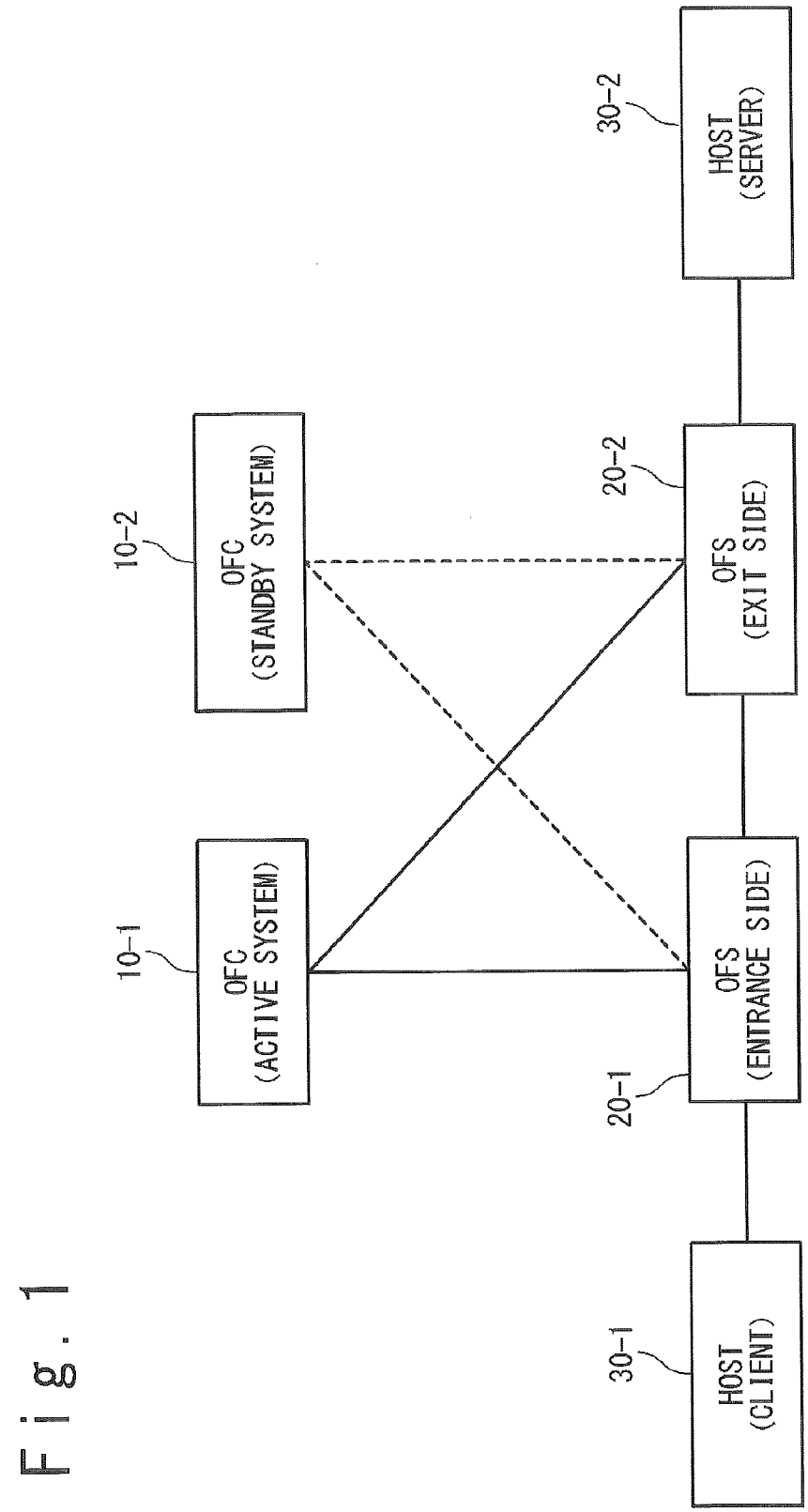
FIG. 1 is a diagram showing a configuration example of a network system related to the present invention.

The present invention is targeting a C/U separation type network. Herein, it will be explained about an OpenFlow™ network which is an example of the C/U separation type network. It should be noted that the present invention is not limited by the OpenFlow™ network.

Exemplary Embodiment

Hereinafter, an exemplary embodiment of the present invention will be described by referring to attached drawings.

(System Configuration)

An example of a configuration of a network system related to the present invention will be described by referring to FIG. 1.

The network system related to the present invention includes a controller (OFC) 10, a switch (OFS) 20 and a host 30.

The controller (OFC) 10, the switch (OFS) 20 and the host 30 may be plural. For example, each of a plurality of controllers (OFC) 20 will be denoted switch (OFS) 20-1, switch (OFS) 20-2, . . . , etc. In FIG. 1, a controller (OFC) 10-1, a controller (OFC) 10-2, a switch (OFS) 20-1, a switch (OFS) 20-2, a host 30-1 and a host 30-2 are shown as an example. It should be noted that the controller (OFC) 10 is made redundant. Herein, the controller (OFC) 10-1 is an active system and the controller (OFC) 10-2 is a standby system.

The controller (OFC) 10 manages the switch (OFS) 20. Between the controller (OFC) 10 and the switch (OFS) 20, a "secure channel", which is a lease line or a communication path protected by SSL (Secure Socket Layer) or the like, is connected. The controller (OFC) 10 and the switch (OFS) 20 perform a communication conforming to an OpenFlow™ protocol via the secure channel. In addition, the controller (OFC) 10 controls the manner, by which the switch (OFS) 20 processes a packet arrived to the switch (OFS) 20, by operating a flow entry which is path information corresponding to each packet. The controller (OFC) 10 will register various flow entries into the switch (OFS) 20. A set of flow entries is managed in a table format called "flow table". The controller (OFC) 10 manages contents of a flow table of each switch (OFS) 20 under control. For example, the controller (OFC) 10 holds a master table of the flow table of each switch (OFS) 20 under control.

The switch (OFS) 20 is connected to neighboring switches (OFS) via a network such as LAN (Local Area Network). In addition, the switch (OFS) 20 can be connected, if the switch (OFS) itself corresponds to an edge switch (OFS), to a client, a server or a network device not yet supporting OpenFlow™, or the like. The switch (OFS) 20 holds at least one flow table.

It should be noted that "holding a flow table" signifies managing this flow table. If this flow table is manageable via a network or the like, this flow table might necessarily be actually inside of the managing device itself. That is, the place this flow table is stored is not limited to inside of the device managing the flow table but can also be outside. For example, it can be considered that the controller (OFC) 10 and the switch (OFS) 20 share a same flow table existing on a network.

The host 30 is connected to the switch (OFS) 20 via a network such as LAN (Local Area Network) and performs a network communication via the switch (OFS) 20. For example, when the host 30-1 accesses to the host 30-2, the host 30-1 becomes a client and the host 30-2 becomes a server. However, in fact, the host 30 is not limited to be a client or a server but can be also a network device not yet supporting OpenFlow™.

(Switch (OFS) Configuration)

Figure 2:
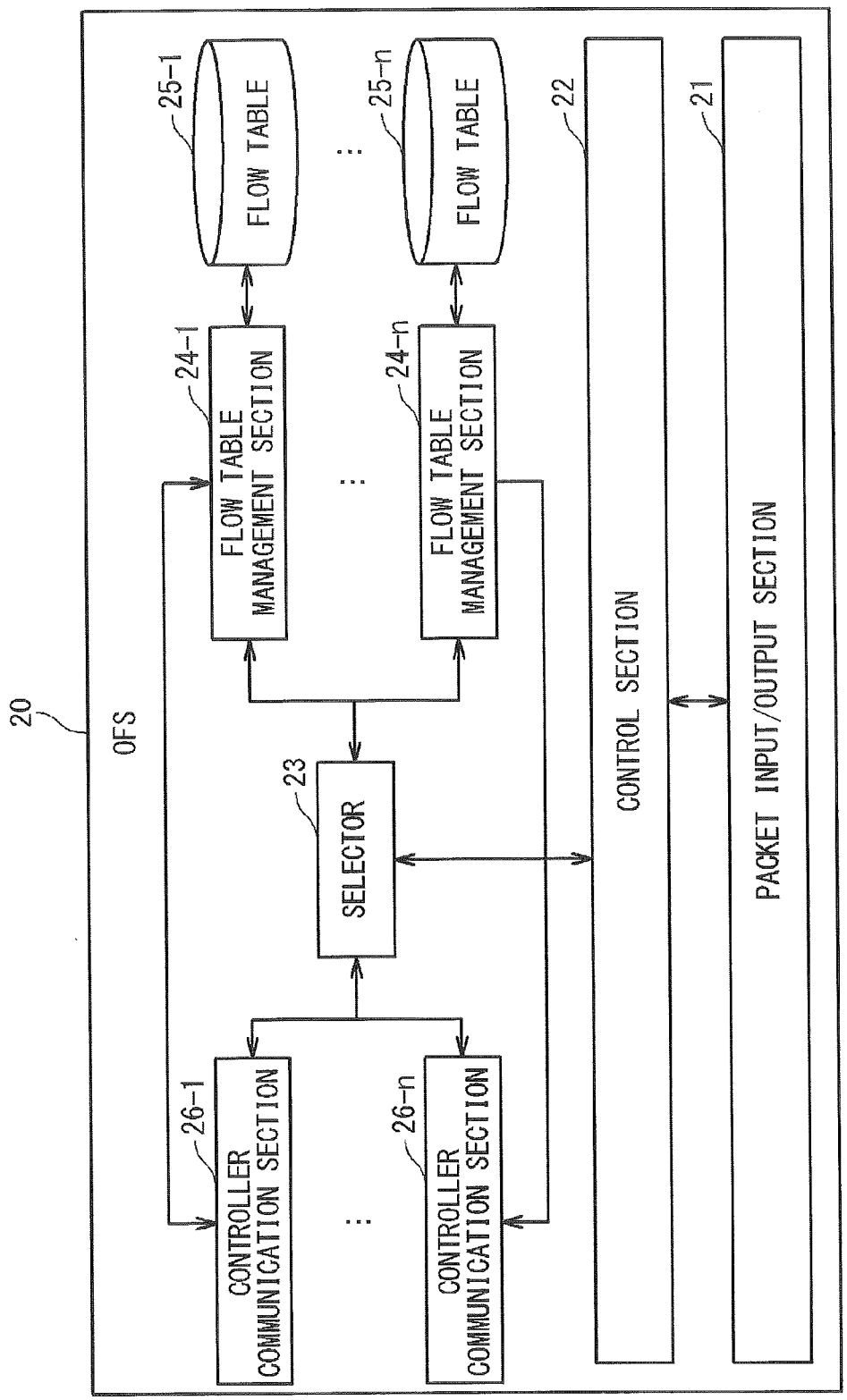
FIG. 2 is a diagram showing a configuration example of a switch (OFS) related to the present invention.

An example of configuration of the switch (OFS) 20 will be described by referring to FIG. 2.

The switch (OFS) 20 includes a packet input/output section 21, a control section 22, a selector 23, a flow table management sections 24 (24-$i$, i=1 to n), a flow tables 25 (25-$i$, i=1 to n) and a controller communication sections 26 (26-$i$, i=1 to n). It should be note that "n" in above described "i=1 to n" is a number of the controller (OFC) 10 connected to the relevant switch (OFS) 20.

The packet input/output section 21 transmits and receives packets between neighboring switch (OFS) 20 or host 30.

The control section 22 performs an inside control of the switch (OFS) 20.

The selector 23 performs communication with each of the control section 22, flow table management sections 24 (24-$i$, i=1 to n) and the controller communication sections 26 (26-$i$, i=1 to n).

Each of the flow table management sections 24 (24-$i$, i=1 to n) manages (adds/updates/deletes) flow entries included in the flow tables 25 (25-$i$, i=1 to n). Each of the flow table management sections 24 (24-$i$, i=1 to n) exists for each controller (OFC) 10 connected to the relevant switch (OFS) 20. That is, each of each of the flow table management section 24 (24-$i$, i=1 to n) is assigned to each controller (OFC) 10. It should be noted that, in fact, each of the flow table management section 24 (24-$i$, i=1 to n) can be one same device/circuit. In this case, the flow table management section 24 (24-$i$, i=1 to n) is supposed to be able to determine to which controller (OFC) 10 corresponds each/individual flow entry of the flow table 25 (25-$i$, i=1 to n).

Each of the flow tables 25 (25-$i$, i=1 to n) is a set of flow entries. For example, each of the flow tables 25 (25-$i$, i=1 to n) is a database for storing path information. Each of the flow tables 25 (25-$i$, i=1 to n) has a unique priority level in the switch (OFS) 20. Each of the flow tables 25 (25-$i$, i=1 to n) exists for each of the controllers (OFC) 10 connected to the relevant switch (OFS) 20. That is, each of the flow tables 25 (25-$i$, i=1 to n) is assigned to each of the controllers (OFC) 10. It should be noted that, in fact, each of the flow tables 25 (25-$i$, i=1 to n) can be one same flow table. In this case, to make determinable by which controller (OFC) 10 an individual flow entry is set, it can be considered to provide in the flow entry a subfield (area) to store a VLAN tag (VLAN ID) or the like for identifying a controller (OFC) 10.

Each of the controller communication sections 26 (26-*i*, i=1 to n) communicates with a destination controller (OFC) 10, conforming to OpenFlow™ protocol. In addition, each of the controller communication sections 26 (26-*i*, i=1 to n) verifies a status of connection with the destination controller (OFC) 10. Each of the controller communication sections 26 (26-*i*, i=1 to n) exists for each of the controllers (OFC) 10 connected to the relevant switch (OFS) 20. That is, each of the controller communication sections 26 (26-*i*, i=1 to n) is assigned to each of the controller (OFC) 10. It should be noted that, in fact, each of the controller communication sections 26 (26-*i*, i=1 to n) can be one same device/circuit. In this case, it can be considered to assign a queue for transmission and reception of the controller communication sections 26 (26-*i*, i=1 to n) to each of the controller (OFC) 10.

Of course, a plurality of controllers (OFC) 10 can be assigned to same ones of the flow table management sections 24 (24-*i*, i=1 to n), the flow tables 25 (25-*i*, i=1 to n) and the controller communication sections 26 (26-*i*, i=1 to n). For example, it can be considered to group the plurality of controllers (OFC) 10 and assign to the controllers (OFC) 10 of the same group a same one of the flow table management sections 24 (24-*i*, i=1 to n), the flow tables 25 (25-*i*, i=1 to n) and the controller communication sections 26 (26-*i*, i=1 to n).

It should be noted that the denotation of "assign" can be read "associate". "Is assigned to each of the controllers (OFC) 10" signifies an association of a specific target with individual controller (OFC) 10 and this is not necessarily limited to a relationship of one-to-one correspondence.

It should be noted that, in fact, the present exemplary embodiment is not limited to the above examples.

(Flow Entry Format)

Figure 3:
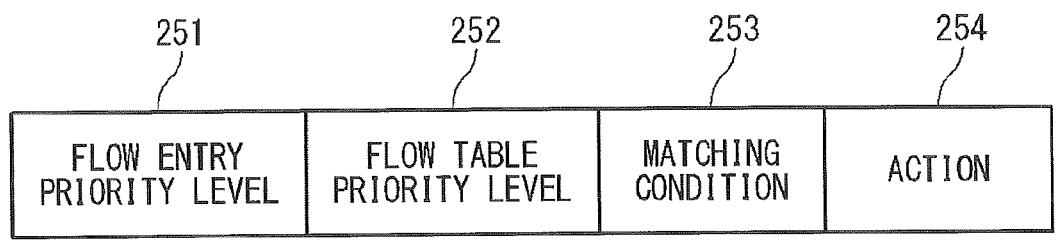
FIG. 3 is a diagram for explaining about a format of a flow entry related to the present invention.

A format of a flow entry related to the present invention will be described by referring to FIG. 3.

A flow entry related to the present invention includes a subfield (area) for each of a flow entry priority level 251, a flow table priority level 252, a matching condition 253 and an action 254.

The flow entry priority level 251 is an area for storing a value showing a priority level of the relevant flow entry itself. The flow table priority level 252 is an area for storing a value showing a priority level of the flow table itself in which is registered the relevant flow entry. The matching condition 253 is an area for storing a value showing a rule of the relevant flow entry. The action 254 is an area for storing a value showing an action of the relevant flow entry.

It should be noted that the priority level of the flow table is equal to the priority level of the corresponding controller (OFC). That is, the priority level of the flow table can be read the priority level of the controller (OFC).

The flow entry related to the present invention is set by the controller (OFC) 10 and thus, the controller (OFC) 10 can arbitrarily specify/modify the value of each subfield (area) of the flow entry related to the present invention. However, in fact, it can be configured so that specification/modification can be realized on switch (OFS) 20 side. For example, the switch (OFS) 20 can decide the priority level of the flow table in accordance with which controller (OFC) 10 to preferentially connect or which controller (OFC) 10 to trust the most.

Of course, the flow entry related to the present invention can be made to include subfields (areas) other than above.

(Operations when Receiving a Packet)

Figure 4:
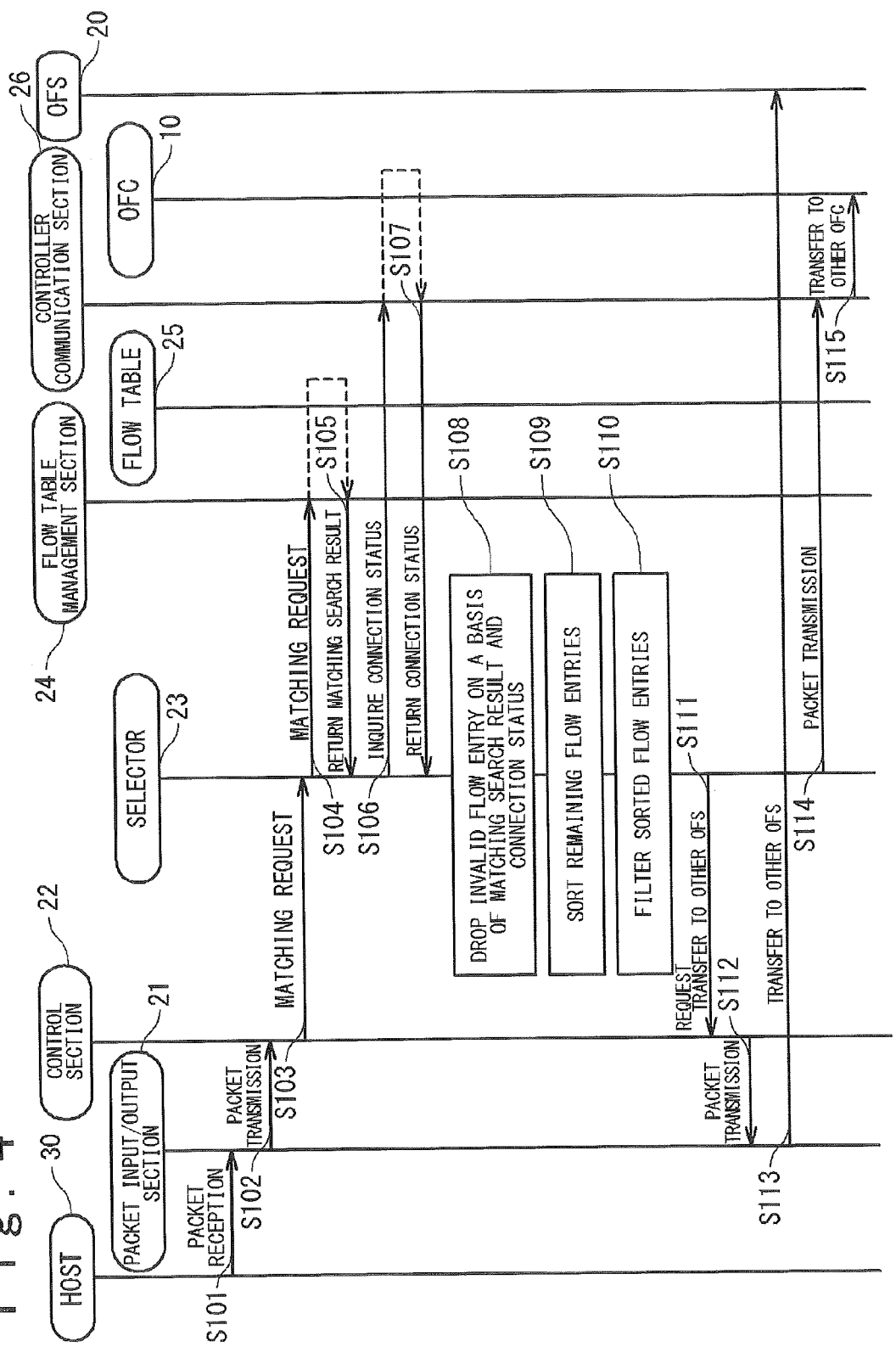
FIG. 4 is a sequence diagram showing an operation when receiving a packet.

An example of operations when the switch (OFS) 20 receives a packet will be described by referring to FIG. 4.

In the example of network configuration shown in FIG. 1, it corresponds to operations of the switch (OFS) 20-1 when receiving a packet from the host 30-1.

(1) Step S101

The packet input/output section 21 of the switch (OFS) 20 receives a packet from the host 30.

(2) Step S102

The packet input/output section 21 of the switch (OFS) 20 transmits the packet to the control section 22.

(3) Step S103

The control section 22 of the switch (OFS) 20 holds the relevant packet, transmits a copy (duplicate) of the relevant packet and requests a matching of the relevant packet to the selector 23 to decide an action against the relevant packet. It should be noted that, in fact, the control section 22 of the switch (OFS) 20 may simply transmit a copy of the relevant packet to the selector 23.

(4) Step S104

The selector 23 of the switch (OFS) 20 transmits a copy of the relevant packet and performs a matching request to each of the flow table management sections 24 (24-*i*, i=1 to n). It should be noted that, in fact, the selector 23 of the switch (OFS) 20 may, when receiving a packet from the control section 22, determine to perform a matching request of the relevant packet to each of the flow table management sections 24 (24-*i*, i=1 to n).

(5) Step S105

In response to the matching request, each of the flow table management sections 24 (24-*i*, i=1 to n) of the switch (OFS) 20 searches in a flow table 25 (25-*i*, i=1 to n) under management of itself to verify whether a flow entry matching with the relevant packet exists and returns to the selector 23, as a matching search result, the existence or not of a matching flow entry and its content.

(6) Step S106

When a matching search result arrives in return from each of the flow table management sections 24 (24-*i*, i=1 to n), the selector 23 of the switch (OFS) 20 inquires to each of the controller communication sections 26 (26-*i*, i=1 to n) about a status of connection with a destination controller (OFC) 10. It should be noted that, in fact, the selector 23 of the switch (OFS) 20 may inquire about the status of connection with the destination controller (OFC) 10 to each of the controller communication sections 26 (26-*i*, i=1 to n) simultaneously with or before the matching request to each of the flow table management sections 24 (24-*i*, i=1 to n) (step S104).

(7) Step S107

In response to the inquiry of connection status, each of the controller communication section 26 (26-*i*, i=1 to n) of the switch (OFS) 20 verifies the status of connection with the destination controller (OFC) 10 and responds information related to the connection status. For example, information of connection status will be "valid" for a controller (OFC) 10 which is in a connected status or is operating and "invalid" for a controller (OFC) 10 which is not in a connected status or is stopped.

(8) Step S108

On a basis of the information related to the connection status and from the matching search result, the selector 23 of the switch (OFS) 20 drops/temporarily disables the flow entry corresponding to an invalid controller (OFC) 10 and leaves only flow entries corresponding to a valid controller (OFC) 10.

(9) Step S109

The selector 23 of the switch (OFS) 20 performs a sorting of flow entries. For example, the selector 23 of the switch (OFS) 20 sorts in an order of priority level of flow entries and, in addition, sorts flow entries of same priority level in an order of priority level of flow tables.

(10) Step S110

The selector 23 of the switch (OFS) 20 performs a filtering of sorted flow entries. Specifically, among remaining flow entries, flow entries of which priority level of flow entry matches with the highest are left and flow entries with lower priority level are all dropped/temporarily invalided.

(11) Step S111

After that, the selector 23 of the switch (OFS) 20 evaluates filtered flow entries in an order of higher priority level and performs, if an action of "transfer to another switch (OFS)" is designated in the action of the evaluated flow entry, a request of transferring to the control section 22, just once. That is, among flow entries designated with "transfer to another switch (OFS)", only the firstly evaluated flow entry will be adopted. Remaining other flow entries designated with "transfer to another switch (OFS)" later evaluated will be ignored.

(12) Step S112

In response to the transfer request, the control section 22 of the switch (OFS) 20 transmits holding packet to the packet input/output section 21. At that time, the control section 22 of the switch (OFS) 20 transfers the holding packet to an output port for transferring to another switch (OFS) 20 among output ports the packet input/output section 21 has.

(13) Step S113

The packet input/output section 21 of the switch (OFS) 20 transfers the packet transmitted from the control section 22 to another switch (OFS) 20.

(14) Step S114

If an action of "transfer to controller (OFC)" (packet-in) is designated as an action of the evaluated flow entry, the selector 23 of the switch (OFS) 20 transfers a copy of the relevant packet to the controller communication section 26 (26-$i$, $i$=1 to n) corresponding to the flow table 25 (25-$i$, $i$=1 to n) to which the relevant flow entry is registered.

(15) Step S115

In conformity with OpenFlow™ protocol, the controller communication sections 26 (26-$i$, $i$=1 to n) of the switch (OFS) 20 transfers a copy of the relevant packet to the controller (OFC) 10 to perform a packet-in. For example, the controller communication section 26 (26-$i$, $i$=1 to n) may store the copy of the relevant packet into a data area of OpenFlow™ message from the switch (OFS) 20 to the controller (OFC) 10, transfer the relevant OpenFlow™ message to the controller (OFC) 10 to perform the packet-in.

That is, when evaluating filtered flow entries in an order of higher priority level, the action of "transfer to another switch (OFS)" is supposed to be performed once only. In addition, the action of "transfer to controller (OFC)" (packet-in) may be performed several times. Of course, the action of "transfer to controller (OFC)" (packet-in) can be supposed to be performed once only, similarly to the action of "transfer to another switch (OFS)".

It should be noted that, in fact, the operation of steps S108 to S111 can be performed by the control section 22 of the switch (OFS) 20 and not by the selector 23 of the switch (OFS) 20. In this case, the control section 22 of the switch (OFS) 20 is supposed to receive necessary information from the selector 23. In addition, the controller section 22 and the selector 23 of the switch (OFS) 20 may be integrated.

(Operations when Detecting Path)

Figure 5:
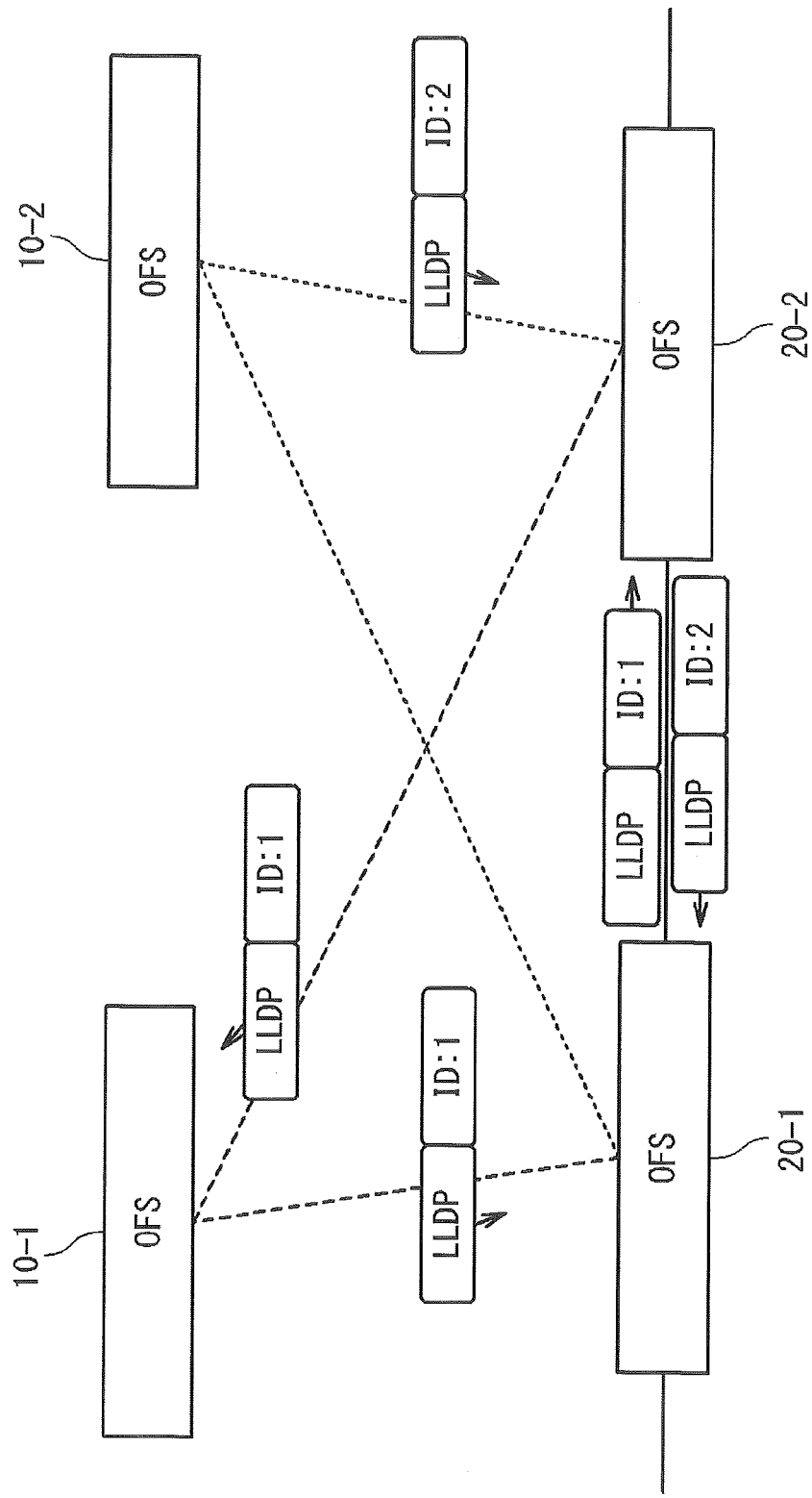
FIG. 5 is a diagram for explaining about an example of an operation when detecting a path.

An example of operations when detecting a path will be described by referring to FIG. 5.

In the present invention, it is necessary to use a "tagged VLAN" so that flows do not be confused among a plurality of controllers in a communication in OpenFlow™ network, such as a communication between switches (OFS), a path detection by LLDP (Link Layer Discovery Protocol) and the like, to identify which controller (OFC) is to be used in each communication. Thus, each switch (OFS) occupies VLAN tags (VLAN IDs) of a same number as the controllers (OFC) to be connected.

Each of the controllers (OFC) 10 independently performs path detection.

Firstly, each of the controllers (OFC) 10 sets/adds a VLAN tag (VLAN ID) for a self-identification to the LLDP packet. Herein, the controller (OFC) 10-1 sets/adds "ID:1" as the VLAN tag (VLAN ID) a self-identification to the LLDP packet. In addition, the controller (OFC) 10-2 sets/adds "ID:2" as the VLAN tag (VLAN ID) for a self-identification to the LLDP packet.

Each of the controllers (OFC) 10 sets for a switch (OFS) 20 under management a flow entry for a packet-in designated with a VLAN tag (VLAN ID), an Ether type and an action of "when receiving a packet matching with the relevant VLAN tag (VLAN ID) and the relevant Ether type, transfer (packet-in) to the relevant controller (OFC)". That is, the VLAN tag (VLAN ID) and the Ether type are a rule (matching condition) of the flow entry for a packet-in. It should be noted that the flow entry for a packet-in is basically a flow entry in an initial condition (default entry) and thus, it is suitable to set a lowest priority level of flow entry. Herein, the controller (OFC) 10-1 designates a matching condition of a VLAN tag (VLAN ID) "ID: 1" and Ether type "LLDP (0x88CC)" to the switch (OFS) 20-1 and the switch (OFS) 20-2 and sets a flow entry for packet-in designating an action of "transfer (packet-in) to the controller (OFC) 10-1". In addition, the controller (OFC) 10-2 designates for the switch (OFS) 20-1 and the switch (OFS) 20-2 a matching condition of a VLAN tag (VLAN ID) "ID: 2" and Ether type "LLDP (0x88CC)" and sets a flow entry for packet-in designating an action of "transfer (packet-in) to the controller (OFC) 10-2". It should be noted that, in fact, each of the controllers (OFC) 10 needs not to set the above flow entry for packet-in to switches (OFS) 20 which instructs to transmit LLDB packets with the below VLAN tag (VLAN ID).

Each of the controllers (OFC) 10 instructs each of the switches (OFS) 20 under management to transmit a LLDB packet with a VLAN tag (VLAN ID). Specifically, each of the controllers (OFC) 10 instructs each of the switches (OFS) 20 under management to transfer a LLDB packet with the VLAN tag (VLAN ID) and transmit the relevant LLDB packet, in conformity with OpenFlow™ protocol. However, in fact, each of the controllers (OFC) 10 may notify a VLAN tag (VLAN ID) for self-identification and instruct to generate and transmit a LLDB packet with the VLAN tag (VLAN ID), to each of the switches (OFS) 20. Herein, the controller (OFC) 10-1 instructs the switch (OFS) 20-1 to transfer a LLDB packet with a VLAN tag (VLAN ID) "ID: 1" to an output port destined for the switch (OFS) 20-2. In addition, the controller (OFC) 10-2 instructs to the switch (OFS) 20-2 to transfer a LLDB packet with a VLAN tag (VLAN ID) "ID: 2" to an output port destined for the switch (OFS) 20-1.

Each of the switch (OFS) 20 transmits a LLDB packet with a VLAN tag (VLAN ID) in response to an instruction from the connected controller (OFC) 10. In addition, when receiving a LLDB packet with VLAN tag (VLAN ID) from another switch (OFS) 20, each of the switches (OFS) 20 transfers (packet-in) it to corresponding controller (OFC) 10 in accordance with an action of a flow entry for packet-in. Herein, the switch (OFS) 20-1 transfers a LLDB packet with a VLAN tag (VLAN ID) "ID: 1" to an output port destined for the switch (OFS) 20-2, in response to an instruction from the controller (OFC) 10-1. In addition, when receiving a LLDB packet with a VLAN tag (VLAN ID) "ID: 2" from the switch (OFS) 20-2, the switch (OFS) 20-1 transfers (packet-in) it to the controller (OFC) 10-2, in accordance to an action of a flow entry for packet-in. In addition, the switch (OFS) 20-2 transfers the LLDB packet with the VLAN tag (VLAN ID) "ID: 2" to the output port destined for the switch (OFS) 20-2, in response to an instruction from the controller (OFC) 10-2. In addition, when receiving a LLDB packet with the VLAN tag (VLAN ID) "ID: 1" from the switch (OFS) 20-1, the switch (OFS) 20-2 transfers (packet-in) it to the controller (OFC) 10-1 in accordance with an action of a flow entry for packet-in.

Consequently, each of the controllers (OFC) 10 can packet-in only LLDP packet handled by each controller itself to a switch (OFS) 20 under management. In addition, on a basis of information packet-ined by each of switches (OFS) 20 under management, each of the controllers (OFC) 10 can collect information about where is connected which port of which switch (OFS) (topology information).

(Operations of Packet-in/Flow Learning)

Next, an example of operation of packet-in/flow learning will be described.

When receiving a packet of which flow is not yet learned (first packet) from outside (host 30 or the like), the control section 22 of the switch (OFS) 20 instructs a search in all tables (matching request) to the selector 23.

The selector 23 of the switch (OFS) 20 request for a search in the flow tables 25 (25-*i*, i=1 to n) under management to each of the flow tables management section 24 (24-*i*, i=1 to n) and collects the result.

While flow learning (while flow entry is not yet registered/while processing flow entry registering), since there is no matching with any flow entry (no matching flow entry is registered), a miss-hit occurs in all flow tables 25 (25-*i*, i=1 to n). Thus, each of the flow table management sections 24 (24-*i*, i=1 to n) returns to the selector 23 a result of miss-hit in the flow tables 25 (25-*i*, i=1 to n) managed by each flow table 25 (25-*i*, i=1 to n) itself.

In a case of miss-hit in all flow tables 25 (25-*i*, i=1 to n), the selector 23 of the switch (OFS) 20 performs a packet-in command (instruction/request) to each of the controller communication sections 26 (26-*i*, i=1 to n).

Each of the controller communication sections 26 (26-*i*, i=1 to n)transfers (packet-in) a packet to the connected controller (OFC) 10, in response to the packet-in command.

After the packet-in, the connected controller (OFC) 10 sets a flow entry to all switches (OFS) 20 from the entrance to the exit of the OpenFlow™ network.

At that time, the controller (OFC) 10 sets a flow entry in which is specified an action of "add a VLAN tag assigned to each controller (OFC)" in the entrance-side switch (OFS) 20-1.

In addition, the controller (OFC) 10 sets a flow entry in which is specified an action of "delete (write back) the VLAN tag added by the entrance-side switch (OFS)" in the exit-side switch (OFS) 20-2.

(Operations when Transferring a Packet)

Figure 6:
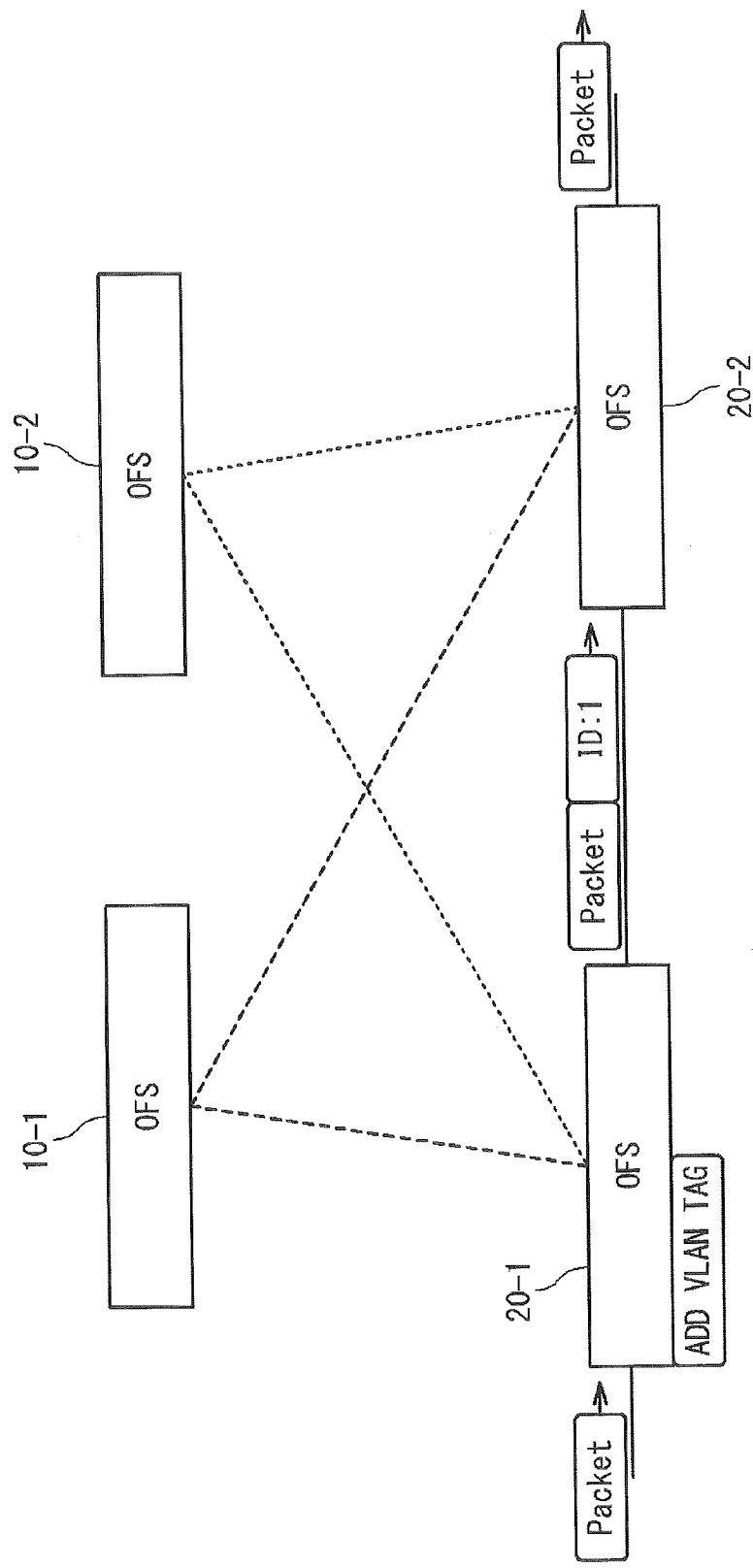
FIG. 6 is a diagram for explaining about an example of an operation when transferring a packet.

An example of operation when transferring a packet will be described by referring to FIG. 6.

When receiving a packet already learned from outside (host 30 or the like), similarly to the case of flow learning, the control section 22 of the switch (OFS) 20 performs an instruction of searching in all table (matching request) to the selector 23.

In a case of redundant configuration such as the present invention, flow entries of a same priority level may match in a plurality of flow tables among flow tables 25 (25-*i*, i=1 to n) (a case where priority level is identical in flow entries registered indifferent flow tables); however, the selector 23 of the switch (OFS) 20 selects one flow table on a basis of the priority level of each flow table (for example, the flow table of the highest priority) and adopts the flow entry registered in the relevant flow table.

The selector 23 of the switch (OFS) 20 performs a request to the control section 22 of transferring a packet.

At that time, the control section 22 of the entrance-side switch (OFS) 20-1 adds to the packet received from outside (host 30 or the like) a VLAN tag (VLAN ID) "ID: 1" assigned to the controller (OFC) 10-1, in accordance with the action of the flow entry.

In addition, the control section 22 of the exit-side switch (OFS) 20-2 deletes (writes back) the VLAN tag (VLAN ID) "ID: 1" added by the entrance-side switch (OFS) 20-1, in accordance with the action of the flow entry for the packet which passed through the entrance-side switch (OFS) 20-1.

(Operations when Failure Occurs)

Next, an example of operations when a failure occurs will be described.

Operations when a failure occurs can be divided into two patterns below, in accordance with the point of failure.

(1) Down of a Controller (OFC)

If a controller (OFC) 10 of an active system has stopped, a flow entry of a flow table corresponding to the downed controller (OFC) 10 is deleted from matching search result of flow table.

At that time, if flow learning is done by a controller (OFC) 10 of a standby system, the switch (OFS) 20 can directly use a flow entry of a flow table corresponding to a controller (OFC) 10 of the standby system to transfer a packet. Alternatively, if flow learning is not yet done, the switch (OFS) 20 can perform packet-in/flow learning by use of controller (OFC) 10 of the standby system and be set a flow entry from the controller (OFC) 10 of the standby system to recover the communication.

(2) Down of a Switch (OFS)

If a switch (OFS) 20 under management has stopped, the controller (OFC) 10 detects the down of the relevant switch (OFS) 20, calculates a new path from which the relevant switch (OFS) 20 is excluded and sets a flow entry related to the new path in a switch (OFS) 20 on the new path.

(Operations when Re-Connecting to the Controller (OFC) in Failure)

Next, an example of operations when re-connecting to the controller (OFC) in which failure has occurred will be described below.

When re-connecting a controller (OFC) 10-1 which has once downed due to a failure, the switch (OFS) 20 may have already done the flow learning and be connected with the controller (OFC) 10-2 of the standby system. In this case, the switch (OFS) 20 as it is does not transfer (packet-in) packets to the re-connected controller (OFC) 10-1 and does not perform a re-learning of flow using the re-connected controller (OFC) 10-1.

Consequently, it is necessary to set a hard time to the flow entry of the entrance-side switch (OFS) 20-1 so that a re-learning is performed every a constant interval. It should be noted that the hard time is a valid period since the relevant flow entry has been registered. When the valid period set as the hard time has elapsed, a hard timeout occurs and the switch (OFS) 20-1 automatically deletes the relevant flow entry. That is, it is a status where the relevant flow entry is not yet registered.

For example, if the hard time is set to "ten minutes", the switch (OFS) 20-1 on the entrance-side deletes a flow entry for timeout when ten minutes have elapsed since the flow entry has been registered. Consequently, a packet matching to the relevant flow entry will return into a packet which is not yet learned (first packet) again and thus the packet can be transferred (packet-in) to the controller (OFC) 10-1 again to perform a re-learning of the flow.

At that time, the switch (OFS) 20-1 of the entrance-side transfers (packet-in) the packet to both of the restored controller (OFC) 10-1 and the controller (OFC) 10-2 of the standby system to perform a flow re-learning.

Thus, at the time ten minutes have elapsed since the flow entry has been registered, the relevant flow entry is deleted and a flow re-learning is performed. If the controller (OFC) 10-1 of the active system is restored when performing the flow re-learning, the switch (OFS) 20-1 of the entrance-side re-starts the communication with the controller (OFC) 10-1 of the active system.

It should be noted that, if the controller (OFC) 10-2 of the standby system in operation has stopped while the flow re-learning, it is switched into the controller (OFC) 10-1 of the restored active system and thus, although a load is applied, the communication is restored after the flow re-learning.

(Load Balancing Configuration)

In the system configuration described above, the controller (OFC) 10-1 is in the active system while the controller (OFC) 10-2 is in the standby system and thus the active system and the standby system are clearly separated; however, by setting a flow entry for packet-in in a switch (OFS) 20, it can be made a load balancing configuration (ACT/ACT configuration) in which both of the controller (OFC) 10-1 and the controller (OFC) 10-2 are in the active system.

For example, a case will be described where it is desired to process a packet of which the destination IP address is "192.168.1.*/24" with the controller (OFC) 10-1 and a packet of which the destination IP address is "192.168.2.*.24" with the controller (OFC) 10-2. It should be noted that "*" denotes a wild card.

In this case, the controller (OFC) 10-1 sets into a flow table 25 (**25-*i*, i=1 to n) corresponding to the controller (OFC) 10-1** itself a flow entry for packet-in in which are designated a matching condition with a destination IP address "192.168.1.*/24" and an action of "transfer (packet-in) to the controller (OFC) 10-1" for a switch (OFS) 20 under management.

In addition, the controller (OFC) 10-2 set into a flow table 25 (**25-*i*, i=1 to n) corresponding to the controller (OFC) 10-2** itself a flow entry for packet-in in which are designated a matching condition with a destination IP address "192.168.2.*/24" and an action of "transfer (packet-in) to the controller (OFC) 10-2" for a switch (OFS) 20 under management.

Consequently, each controller (OFC) 10 will be sent from the switch (OFS) 20 under management only packets which satisfy the matching condition set by each controller (OFC) 10 itself. Thus, the processes can be distributed to a plurality of controllers (OFC).

At that time, for example, even if the controller (OFC) 10-1 is stopped, when a new packet arrives to the entrance-side switch (OFS) 20-1, the selector 23 of the relevant switch (OFS) 20-1 evaluates the flow entry, drops/temporarily disable a flow entry set by the invalid controller (OFC) 10-1, performs a flow re-learning by using the controller (OFC) 10-2 and re-sets the flow entry. Thus, a redundancy can be kept in a load balancing configuration too.

(Summary)

As described above, in the network system related to the present invention, a redundant configuration and a load balancing configuration can be realized, regardless of a specification of the controller (OFC).

In the network system related to the present invention, by increasing the flow table and the controller communication section by the switch (OFS) side, it is possible to freely increase a number of the controllers (OFC) to be connected simultaneously.

In the networks system related to the present invention, a complicated mechanism/process of synchronization between controllers (OFS) is not necessary. In addition, when a failure occurs, a flow table of a stopped controller (OFC) will not be referred. Consequently, cleaning-up (deleting) or rewriting (updating) of a flow entry which became unnecessary will be unnecessary and thus, the communication can be restored quickly.

(Hardware Exemplification)

Detailed examples of hardware to realize a network system related to the present invention will be described below.

As examples of the controller (OFC) and the host can be considered a computer such as a PC (Personal Computer), an appliance, a thin client computer, a work station, a main frame, a super computer and the like. In addition, as other examples of the host can be also considered an IP telephone, a mobile telephone, a smart phone, a smart book, a car navigation system, a mobile game device, a game device for a home use, a mobile music player, a handy terminal, a gadget (electronic device), an interactive television, a digital tuner, a digital recorder, an information home appliance, an OA (Office Automation) device, a shop front terminal/highly functional copy machine, a digital signage and the like. It should be noted that a the controller (OFC) and the host are note limited by a terminal or a server but can also be a relay device or a peripheral device. In addition, the controller (OFC) and the host can also be an expansion board mounted on a computer or the like or a VM (Virtual Machine) configured on a physical machine.

As examples of the switch (OFS) can be considered a network switch, a route, a proxy, a gateway, a firewall, a load balancer, a packet shaper, a SCADA (Supervisory Control And Data Acquisition), a gate keeper, a base station, an AP (Access Point), a CS (Communication Satellite) or a computer with a plurality of communication ports or the like. In addition, it can also be a virtual switch realized by a virtual machine configured on a physical machine.

The controller (OFC), the switch (OFS) and the host can be mounted on a moving body such as a vehicle, a ship or an aircraft.

It is not shown by a drawing but each of the controller (OFC), the switch (OFS) and the host are realized by a processor which drives on a basis of a program to execute specified processes, a memory which stores the relevant program and each kind of data and an interface used for a communication with the network.

As examples of the above processor, can be considered a CPU (Central Processing Unit), a NP (Network Processor), a microprocessor, a microcontrollers or a LSI (Large Scale Integration) having dedicated functions.

As examples of the above memory, can be considered: a semiconductor memory device such as a RAM (Random Access Memory), a ROM (Read Only Memory), an EEPROM (Electrically Erasable and Programmable Read Only Memory), a flash memory or the like; an auxiliary storage device such as a HDD (Hard Disk Drive), a SSD (Solid State Drive) or the like; a removable disk such as a DVD (Digital Versatile Disk) or the like; or a storage medium such as a SD (Secure Digital) memory card or the like. In addition, it can also be a buffer or a register. Alternatively, it can also be a storage device such as a DAS (Direct Attached Storage), a FC-SAN (Fibre Channel-Storage Area Network), a NAS (Network Attached Storage), an IP-SAN (IP-Storage Area Network) or the like.

It should be noted that the above processor and the above memory can be integrated. For example, in recent years, an integration of a microcomputer or the like into one chip is progressing. Consequently, it can be considered a case where a one-chipped microcomputer mounted on an electronic device is provided of the above processor and the above memory.

As examples of the above interface, can be considered: a semiconductor integrated circuit such as a substrate compliant with a network communication (mother board, I/O board) or a chip; a network adapter or a similar expansion card such as a NIC (Network Interface Card); a communication device such as an antenna; a communication port such as a connector or the like; and the like.

In addition, as examples of a network, can be considered Internet, LAN (Local Area Network), Wireless LAN, WAN (Wide Area Network), a Backbone, a CATV (Cable Television) line, a fixed telephone network, a mobile telephone network, WiMAX™ (IEEE 802.16a), 3G (3rd Generation), a lease line, IrDA™ (Infrared Data Association), Bluetooth™, a serial communication line, a data bus and the like.

It should be noted that internal component of each of the controller (OFC), the switch (OFS) and the host can be a module, a component or a dedicated device, or a program to start-up (call) those devices.

It should be noted that, in fact, those examples are not limitative.

(Feature of the Present Invention)

As described above, the present invention is related to a network system using a mechanism to communicate with a plurality of controllers (OFC) and a switch (OFS) having flow tables assigned to each of controllers and a method of configuring a network.

The switch (OFS) related to the present invention includes a plurality of mechanisms to communicate with the controllers (OFC) and a plurality of flow tables, simultaneously communicates with the plurality of controllers (OFC) and is able to perform correct communication, even without synchronization between the controllers (OFC), by switching on the switch (OFS) side the flow table with which the communication is to be performed.

To realize ACT/ACT configuration for a redundancy of controllers (OFC)/load balancing, the switch (OFS) related to the present invention includes a selector which determines/selects which flow table among the plurality of flow tables is to be used, in accordance with a search result of flow table and status of connection with the controllers (OFC).

The switch (OFS) related to the present invention detects a failure of a controller (OFC) on the switch (OFS) side, drops/temporarily disables a flow entry of a flow table corresponding to the controller (OFC) in which the failure occurred and continues a communication by using a flow entry of a flow table corresponding to another operating controller (OFC).

In the present invention, since the mechanism to communicate with the plurality of controllers (OFC) and the plurality of flow tables are individually assigned on the switch (OFS) side, each controller (OFC) can freely use a flow table assigned to the controller (OFC) itself. In addition, no process of synchronization with other controller (OFC) is necessary. Thus, a free redundancy configuration and load balancing configuration can be assembled.

Even if a failure occurs in a controller (OFC) of the active system, if a controller (OFC) of a standby system is operating, it is possible to continue processes with the operating controller (OFC) by dropping/temporarily disabling a flow entry of a flow table corresponding to the failure occurring controller (OFC) and thus a controller (OFC) of a new active system needs not to perform deletion of unnecessary flow entry or the like.

REMARKS

Exemplary embodiments of the present invention have been described above; however it should be noted that, in fact, the present invention is not limited by the above exemplary embodiments and variations in a scope which does not depart from the spirit of the present invention are included in the present invention.

The present invention claims priority based on Japanese Patent Application 2012-048014. Its disclosure is incorporated herein by reference.

The invention claimed is:

1. A network system, comprising:
an OpenFlow™ switch configured to perform a process on a received packet in accordance with a flow entry in which are defined a rule and an action for uniformly controlling a packet as a flow; and
a plurality of OpenFlow™ controllers configured to set said flow entry to a flow table of said switch,
wherein said OpenFlow™ switch assigns a flow table to each of said plurality of OpenFlow™ controllers, searches when receiving a packet from outside for a flow table matching with said packet in all flow tables, verifies a status of connection with each of said plurality of OpenFlow™ controllers, ignores a flow entry set by a controller of which a status of connection is invalid among flow entries matching with said packet and processes said packet in accordance with an action of a flow entry set by an OpenFlow™ controller of which a status of connection is valid.

2. The network system according to claim 1, wherein said OpenFlow™ switch adopts, if a plurality of flow entries set by a controller of which a status of connection is valid exists, a flow entry of which a priority level of said flow entry itself is highest and adopts, if a plurality of flow entries with a same priority level exist, a flow table of which a priority level of a flow table in which said flow entry is set is highest.

3. The network system according to claim 1, wherein each of said plurality of OpenFlow™ controllers sets a flow entry for packet-in, in which are set a matching condition to match a packet to make said switch transfer to said each OpenFlow™ controller itself and an action to transfer said packet to said each OpenFlow™ controller itself, to perform a load balancing.

4. A controller used in the network system according to claim 1.

5. A switch, comprising:
an interface; and
a processor connected to said interface,
wherein said processor is configured to:
communicate with each of a plurality of controllers which set a flow entry in which are defined a rule and an action for uniformly controlling a packet as a flow; and
manage a flow table, assigned to each controller, in which is set a flow entry by said each controller,
wherein said processor searches, when receiving a packet from outside, a flow entry matching with said packet in all flow tables,
wherein said processor verifies a status of connection with said each controller, and
wherein said processor is configured to ignore a flow entry set by a controller of which a connection status is invalid and processing said packet in accordance to an action of a flow entry set by a controller of which a connection status is valid, among flow entries matching with said packet.

6. The switch according to claim 5, wherein said processor adopts, if a plurality of flow entries set by a controller of which a connection status is valid exist, a flow entry of which a priority level of the flow entry itself is highest, and
wherein said processor adopts, if a plurality of flow entries with a same priority level exist, a flow entry of which a priority level of a flow table in which said flow entry is set is highest.

7. A method of configuring a network, the method comprising:
a switch performing a process on a received packet in accordance with a flow entry in which are defined a rule and an action for uniformly controlling a packet as a flow;
a plurality of controllers setting said flow entry to a flow table of said switch;
said switch assigning a flow table for each of said plurality of controllers;
said switch searching, when receiving a packet from outside, a flow entry matching with said packet in all flow tables;
said switch verifying a status of connection with each of said plurality of controllers; and
said switch ignoring a flow entry set by a controller of which a connection status is invalid and processing said packet in accordance with an action of a flow entry set by a controller of which a connection status is valid, among flow entries matching with said packet.

8. The method of configuring a network according to claim 7, further comprising:
said switch adopting, if a plurality of flow entries set by a controller of which a connection status is valid exist, a flow entry of which a priority level of said flow entry itself is highest; and
said switch adopting, if a plurality of flow entries with a same priority level exist, a flow entry of which a priority level of a flow table in which said flow entry is set is highest.

9. The method of configuring a network according to claim 7, further comprising:
each of said plurality of controllers setting a flow entry for packet-in in which are set a matching condition to match a packet to make said switch transfer to said each controller itself and an action to transfer said packet to said each controller itself, to perform a load balancing.

10. A non-transitory recording medium storing a program to make a controller execute operations of the method of configuring a network according to claim 7.

11. A non-transitory recording medium storing a program to make a switch execute each operation defined to be realized by a switch in a method of configuring a network, said method comprising:
said switch performing a process on a received packet in accordance with a flow entry in which are defined a rule and an action for uniformly controlling a packet as a flow;
said switch assigning a flow table for each of said plurality of controllers;
said switch searching, when receiving a packet from outside, a flow entry matching with said packet in all flow tables;
said switch verifying a status of connection with each of said plurality of controllers; and
said switch ignoring a flow entry set by a controller of which a connection status is invalid and processing said packet in accordance with an action of a flow entry set by a controller of which a connection status is valid, among flow entries matching with said packet.

12. The non-transitory recording medium storing the program according to claim 11 to further make the switch execute each operation defined to be realized by the switch in the method of configuring the network, the method further comprising:
said switch adopting, when a plurality of flow entries set by a controller of which a connection status is valid exist, a flow entry of which a priority level of said flow entry itself is highest; and
said switch adopting, when a plurality of flow entries with a same priority level exist, a flow entry of which a priority level of a flow table in which said flow entry is set is highest.

* * * * *